US008516850B2

(12) United States Patent
Jadric et al.

(10) Patent No.: US 8,516,850 B2
(45) Date of Patent: Aug. 27, 2013

(54) MOTOR COOLING APPLICATIONS

(75) Inventors: Ivan Jadric, York, PA (US); Steven J Estes, York, PA (US); John C Hansen, Spring Grove, PA (US); Koman B Nambiar, Frederick, MD (US); Andrew M Welch, Mt. Wolf, PA (US); Steven T Sommer, York, PA (US); Gregory K Beaverson, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 924 days.

(21) Appl. No.: 12/501,628

(22) Filed: Jul. 13, 2009

(65) Prior Publication Data
US 2010/0006264 A1 Jan. 14, 2010

Related U.S. Application Data

(60) Provisional application No. 61/080,658, filed on Jul. 14, 2008.

(51) Int. Cl.
*F25B 31/02* (2006.01)
*F25B 31/00* (2006.01)

(52) U.S. Cl.
USPC .......................................................... 62/505

(58) Field of Classification Search
USPC .......................................................... 62/505
See application file for complete search history.

(56) References Cited

U.S. PATENT DOCUMENTS

| 2,571,872 | A | * | 10/1951 | Hayes ............................ 310/54 |
| 3,150,277 | A | * | 9/1964 | Chubb et al. .................... 310/54 |
| 3,192,735 | A | * | 7/1965 | Bernhard ........................ 62/222 |
| 3,222,555 | A | * | 12/1965 | Snoberger et al. .......... 310/68 R |
| 3,306,074 | A | | 2/1967 | Wilson |
| 4,903,497 | A | * | 2/1990 | Zimmern et al. ............... 62/113 |
| 5,469,713 | A | * | 11/1995 | Wardle et al. ..................... 62/84 |
| 5,859,482 | A | * | 1/1999 | Crowell et al. ................. 310/58 |
| 6,134,911 | A | * | 10/2000 | Kishimoto et al. ............. 62/505 |
| 6,434,960 | B1 | * | 8/2002 | Rousseau ..................... 62/228.4 |
| 6,633,097 | B2 | * | 10/2003 | Dunlap et al. .................. 310/54 |
| 6,819,016 | B2 | * | 11/2004 | Houle et al. .................... 310/52 |
| 6,992,411 | B2 | * | 1/2006 | Houle et al. .................... 310/52 |
| 7,181,928 | B2 | | 2/2007 | De Larminat |
| 7,437,882 | B2 | | 10/2008 | Matsunaga et al. |

(Continued)

FOREIGN PATENT DOCUMENTS

| DE | 37 29 486 C1 | 12/1988 |
| JP | 60032985 A | 2/1985 |
| JP | 2001095205 A | 4/2001 |

(Continued)

OTHER PUBLICATIONS

"Turbocor"; www.turbocor.com/literature/product_literature.html; (accessed Jul. 10, 2009); p. 30.

*Primary Examiner* — Judy Swann
*Assistant Examiner* — Alexis Cox
(74) *Attorney, Agent, or Firm* — McNees Wallace & Nurick LLC

(57) ABSTRACT

A cooling system for a motor powering a compressor in a vapor compression system includes a housing and a cavity within the housing. A first fluid circuit has a first connection to receive a refrigerant into the cavity, and a second connection to deliver refrigerant from the cavity to a heat exchanger for a heat transfer relationship with a heat-generating component.

17 Claims, 10 Drawing Sheets

(56) References Cited

U.S. PATENT DOCUMENTS

| | | | |
|---|---|---|---|
| 8,261,575 B1* | 9/2012 | Holmes | 62/505 |
| 2002/0002840 A1 | 1/2002 | Nakane et al. | |
| 2004/0056541 A1* | 3/2004 | Steinmeyer | 310/52 |
| 2006/0113851 A1 | 6/2006 | Ishihara | |
| 2008/0245082 A1* | 10/2008 | Sishtla | 62/84 |

FOREIGN PATENT DOCUMENTS

| | | |
|---|---|---|
| JP | 2008082623 A | 4/2008 |
| WO | 00/22359 A1 | 4/2000 |
| WO | 2008045413 A2 | 4/2008 |

* cited by examiner

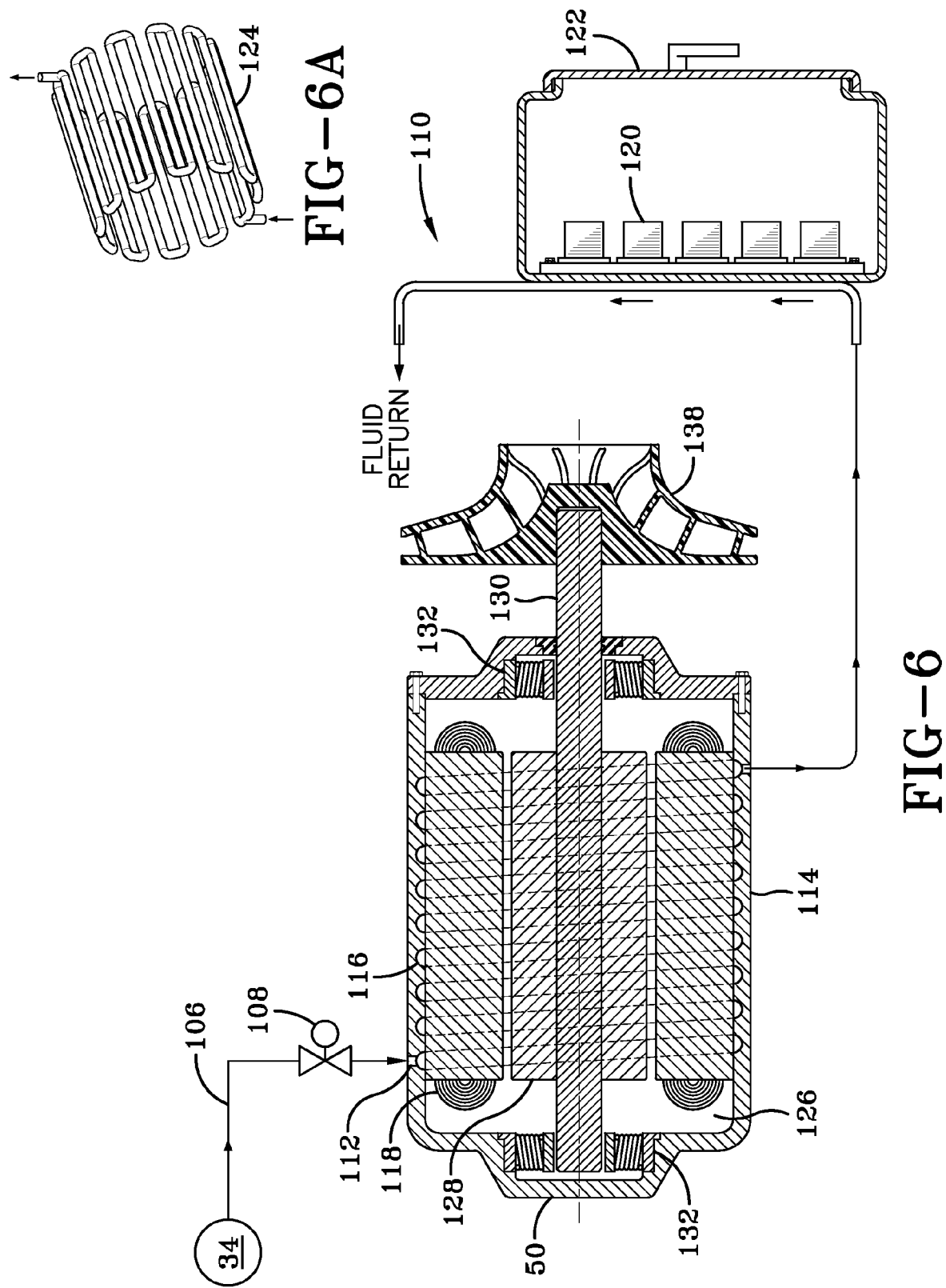

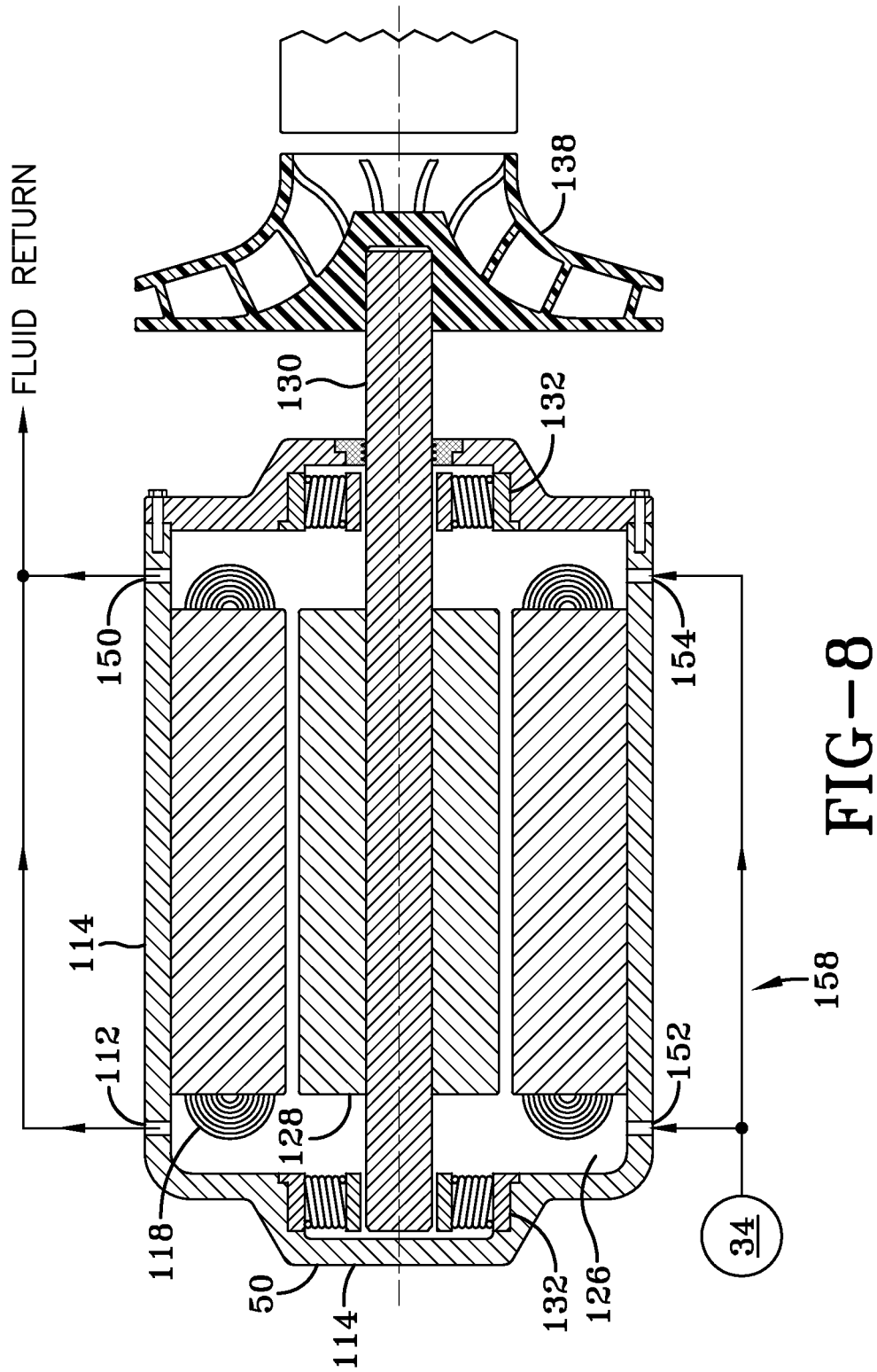

_US 8,516,850 B2_

MOTOR COOLING APPLICATIONS

CROSS-REFERENCE TO RELATED APPLICATIONS

This application claims priority from and the benefit of U.S. Provisional Application No. 61/080,658, entitled MOTOR APPLICATIONS, filed Jul. 14, 2008, which is hereby incorporated by reference.

BACKGROUND

This application relates generally to the cooling of motors for vapor compression systems incorporated in air conditioning and refrigeration applications.

Vapor compression systems can use more compact motors operating at higher rotational speeds to provide power to components. By using more compact motors, a reduction in the size of the systems can be obtained. In addition, gains in motor efficiency may also be realized at high rotational speeds. However, some challenges associated with operating motors at higher rotational speeds include the generation of friction between the motor shaft and bearings and windage losses. Windage is a frictional force created between the rotating rotor of the motor and the environment surrounding the rotor, typically air or a working media, such as refrigerant vapor in the case of a hermetic driveline. Windage can create heat and reduce the operational efficiency of the motor.

SUMMARY

The present invention relates to a cooling system is provided for a motor powering a compressor in a vapor compression system. The cooling system including a housing and a cavity within the housing. A first fluid circuit has a first connection to receive a refrigerant into the cavity, and a second connection to deliver refrigerant from the cavity to a heat exchanger for a heat transfer relationship with a heat-generating component.

The present invention further relates to a cooling system for a motor powering a compressor in a vapor compression system. The cooling system includes a housing and a cavity within the housing. The housing includes a plurality of grooves formed within the cavity. A first fluid circuit has a first connection to receive a refrigerant into the cavity and a second connection to deliver refrigerant from the cavity to a heat exchanger for a heat transfer relationship with a heat-generating component associated with operation of the vapor compression system.

BRIEF DESCRIPTION OF THE FIGURES

FIGS. 6, 6A, 7A, 7B, 8, 9 and 9A illustrate exemplary embodiments of motor cooling of systems.

DETAILED DESCRIPTION OF THE EXEMPLARY EMBODIMENTS

Figure 1:
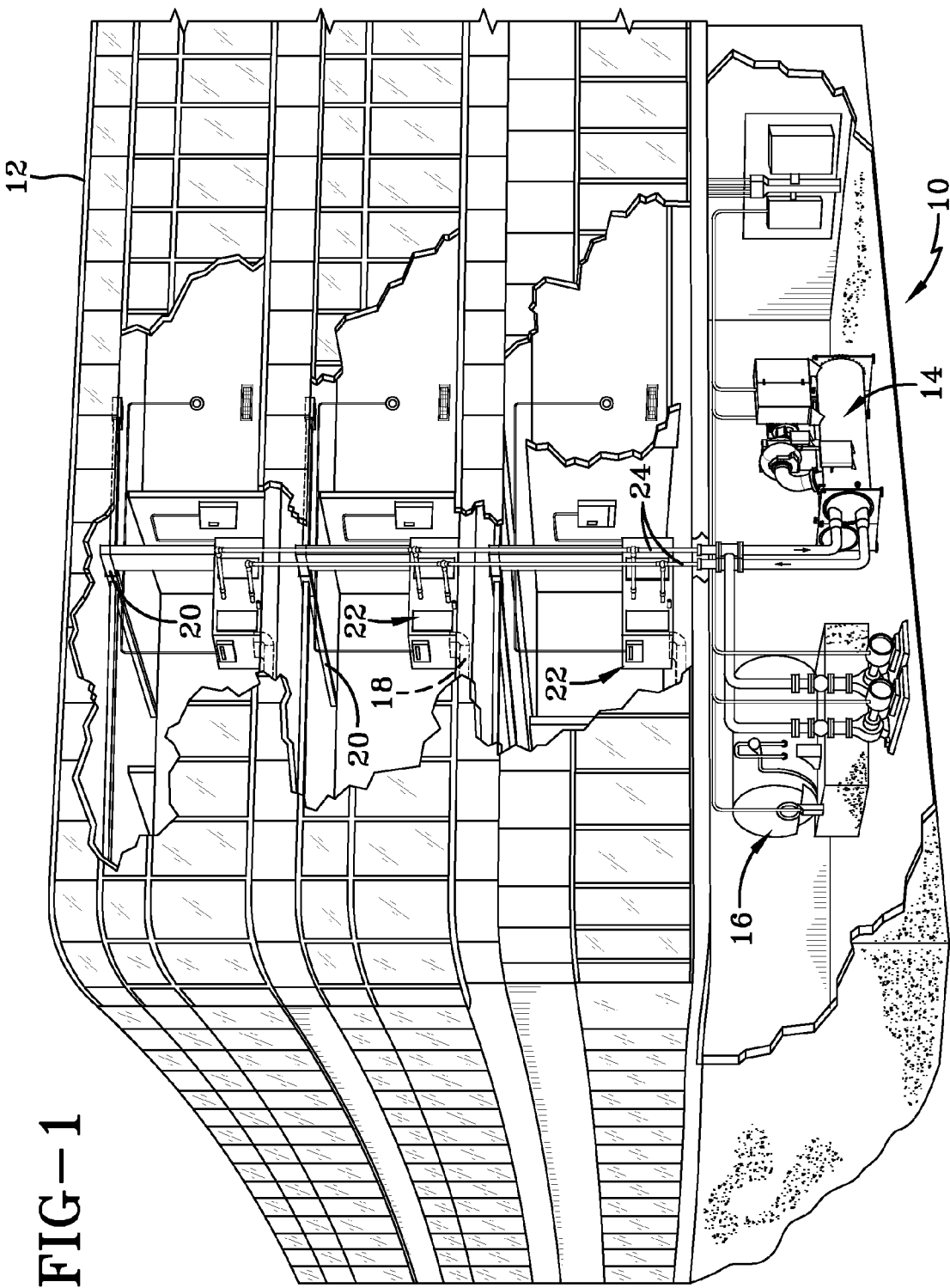
FIG. 1 shows an exemplary embodiment for a heating, ventilation and air conditioning system in a commercial setting.

FIG. 1 shows an exemplary environment for a heating, ventilation and air conditioning (HVAC) system 10 incorporating a chilled liquid system in a building 12 for a typical commercial setting. System 10 can include a vapor compression system 14 that can supply a chilled liquid which may be used to cool building 12. System 10 can include a boiler 16 to supply a heated liquid that may be used to heat building 12, and an air distribution system which circulates air through building 12. The air distribution system can also include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
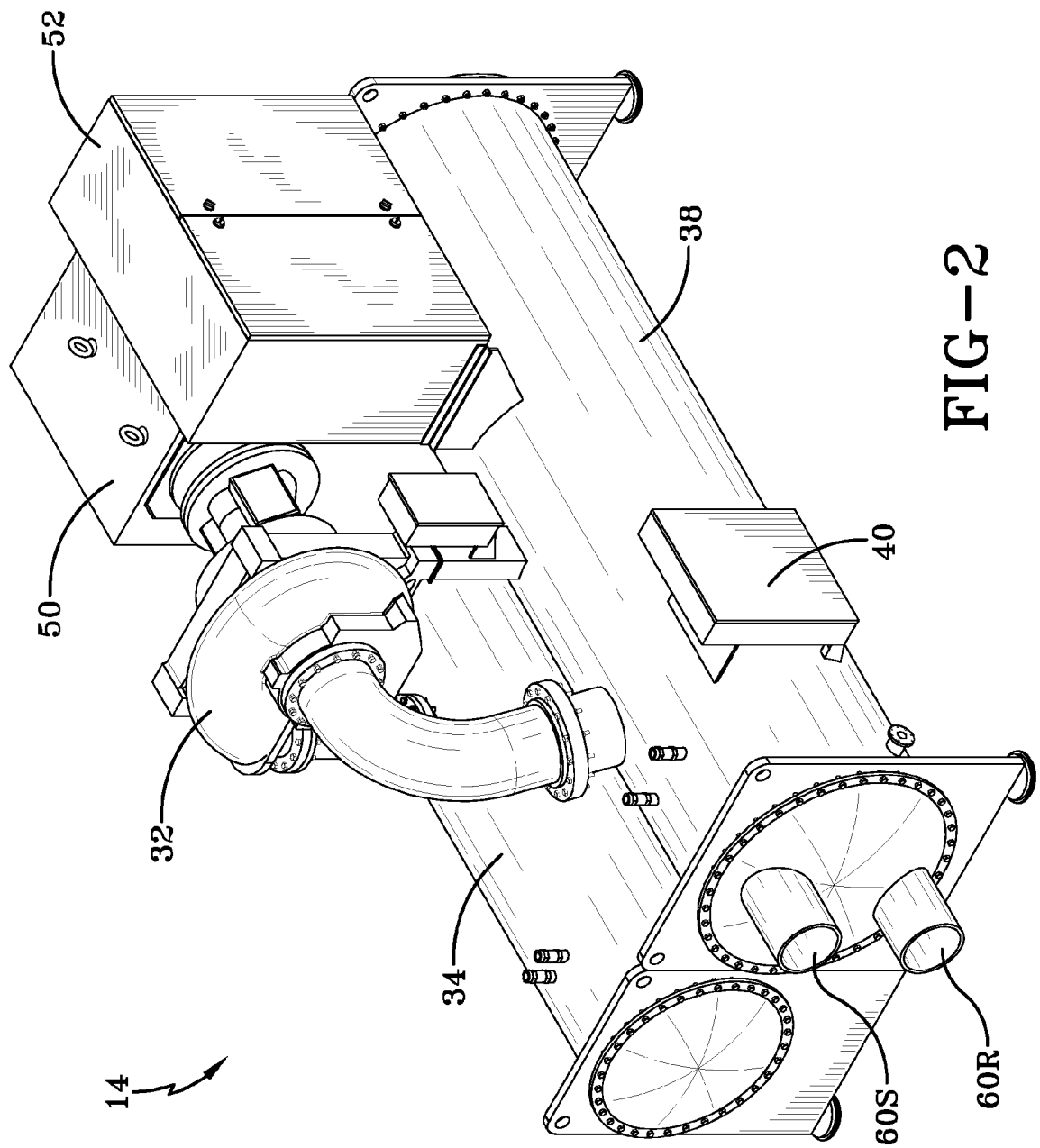
FIG. 2 shows an isometric view of an exemplary vapor compression system.
Figure 3:
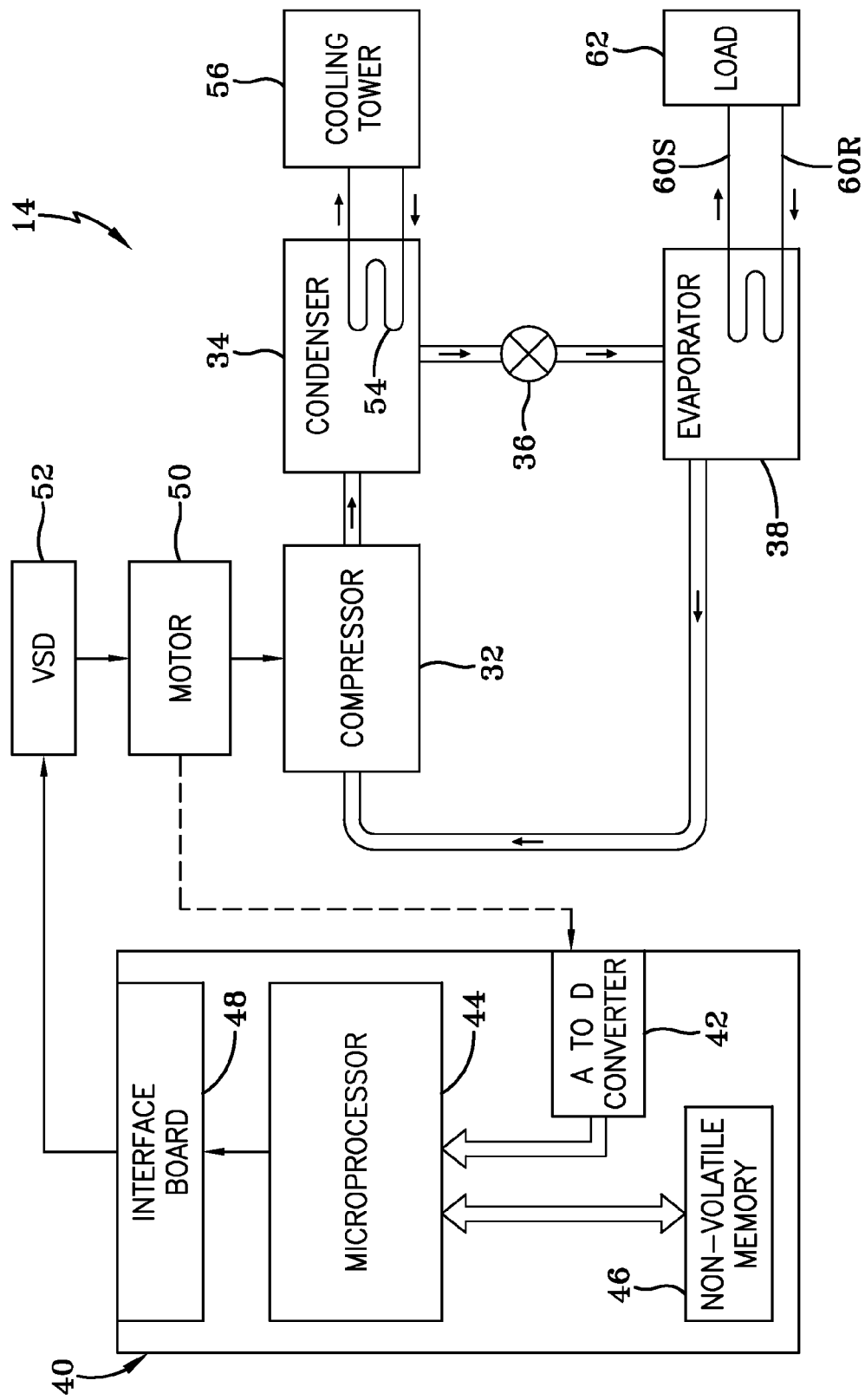
FIGS. 3 and 4 schematically illustrate exemplary embodiments of a vapor compression system.

FIGS. 2 and 3 show an exemplary vapor compression system 14 that can be used in an HVAC system, such as HVAC system 10. Vapor compression system 14 can circulate a refrigerant through a compressor 32 driven by a motor 50, a condenser 34, expansion device(s) 36, and a liquid chiller or evaporator 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are: hydrofluorocarbon (HFC) based refrigerants, for example, R-410A, R-407C, R-134a hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant. In an exemplary embodiment, vapor compression system 14 may use one or more of each of variable state drives (VSDs) 52, motors 50, compressors 32, condensers 34 and/or evaporators 38.

Motor 50 used with compressor 32 can be powered by a VSD 52 or can be powered directly from an alternating current (AC) or direct current (DC) power source. VSD 52, if used, receives AC power having a particular fixed line voltage and fixed line frequency from the AC power source and provides power having a variable voltage and frequency to motor 50. Motor 50 can include any type of electric motor that can be powered by a VSD or directly from an AC or DC power source. For example, motor 50 can be a switched reluctance motor, an induction motor, an electronically commutated permanent magnet motor or any other suitable motor type.

Compressor 32 compresses a refrigerant vapor and delivers the vapor to condenser 34 through a discharge line. Compressor 32 can be a centrifugal compressor, screw compressor, reciprocating compressor, rotary compressor, swing link compressor, scroll compressor, turbine compressor, or any other suitable compressor. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle having a supply line 60S and a return line 60R connected to a cooling load 62. A process fluid, for example, water, ethylene glycol, calcium chloride brine, sodium chloride brine, or any other suitable liquid, enters evaporator 38 via return line 60R and exits evaporator 38 via supply line 60S. Evaporator 38 lowers the temperature of the process fluid in the tubes. The tube bundle in evaporator 38 can include a plurality of tubes and a plurality of tube bundles. The vapor refrigerant exits evaporator 38 and returns to compressor 32 by a suction line to complete the cycle or loop.

Figure 4:
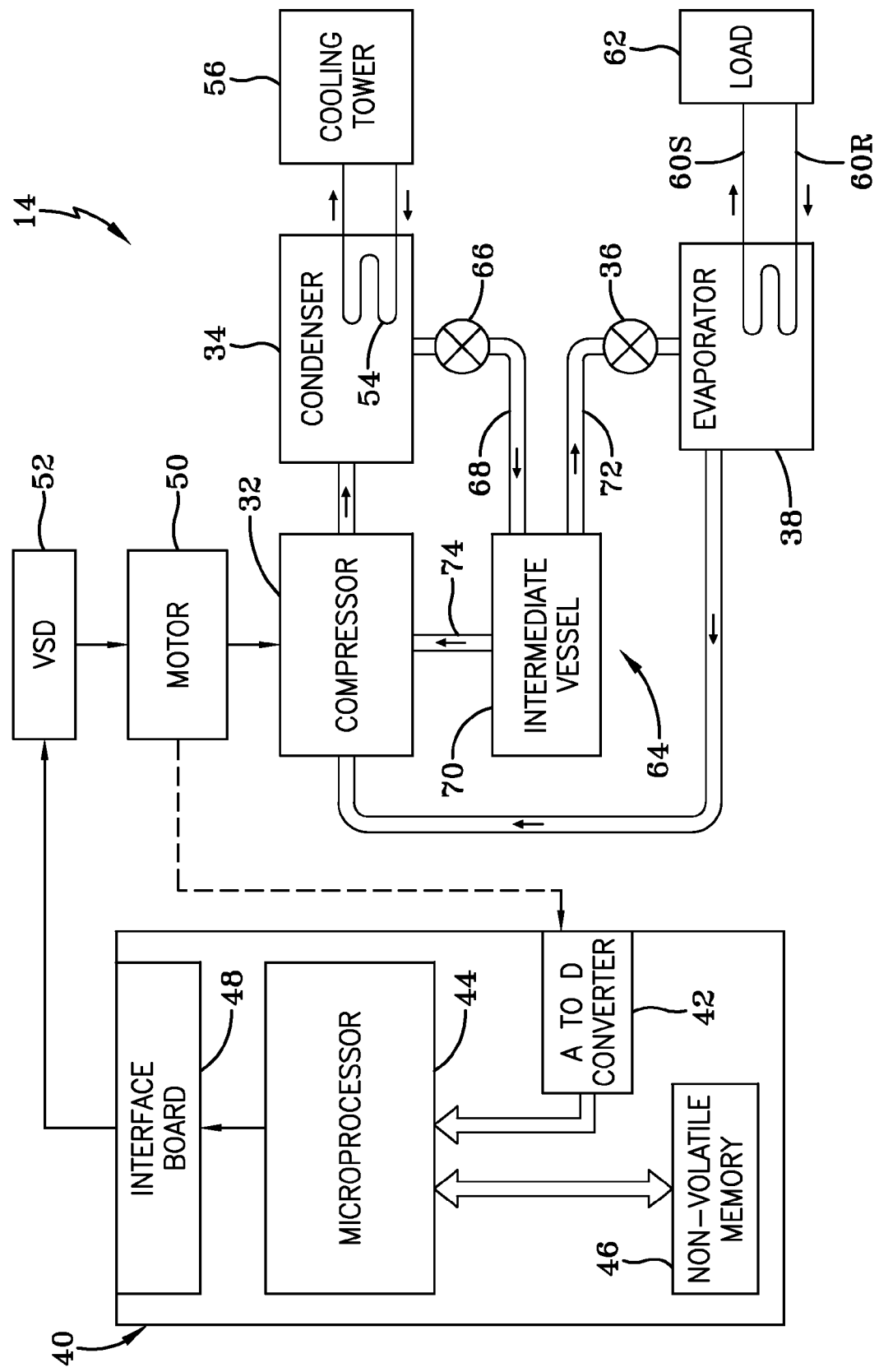

FIG. 4, which is similar to FIG. 3, shows the refrigerant circuit with an intermediate circuit 64 that may be incorporated between condenser 34 and expansion device 36 to provide increased cooling capacity, efficiency and performance. Intermediate circuit 64 has an inlet line 68 that can be either connected directly to or can be in fluid communication with condenser 34. As shown, inlet line 68 includes an expansion device 66 positioned upstream of an intermediate vessel 70. Intermediate vessel 70 can be a flash tank, also referred to as a flash intercooler, in an exemplary embodiment. In an alternate exemplary embodiment, intermediate vessel 70 can be configured as a heat exchanger or a "surface economizer". In the flash intercooler embodiment, a first expansion device 66 operates to lower the pressure of the liquid received from condenser 34. During the expansion process in a flash intercooler, a portion of the liquid is evaporated. Intermediate vessel 70 may be used to separate the evaporated vapor from the liquid received from condenser 34. The evaporated liquid may be drawn by compressor 32 to a port at a pressure intermediate between suction and discharge or at an intermediate stage of compression, through a line 74. The liquid that is not evaporated is cooled by the expansion process, and collects at the bottom of intermediate vessel 70, where the liquid is recovered to flow to the evaporator 38, through a line 72 having expansion device 36.

In the "surface economizer" or "surface intercooler" arrangement, the implementation is slightly different, as known to those skilled in the art. Intermediate circuit 64 can operate in a similar matter to that described above, except that instead of receiving the entire amount of refrigerant from condenser 34, as shown in FIG. 4, intermediate circuit 64 receives only a portion of the refrigerant from condenser 34 and the remaining refrigerant proceeds directly to expansion device 36 (not shown).

Figure 5:
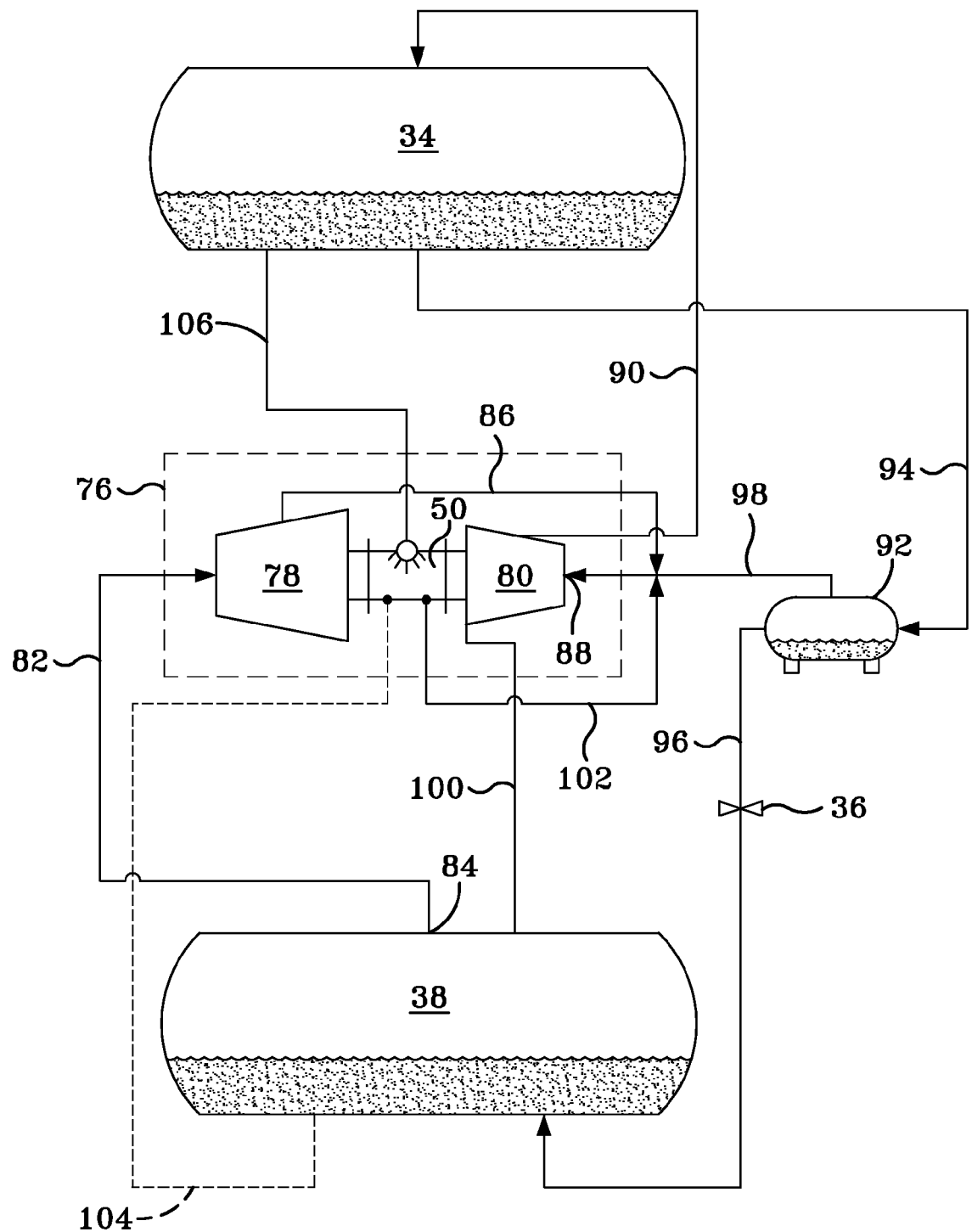
FIG. 5 schematically illustrates an exemplary embodiment of a cooling system for a multi-stage vapor compression system.

In FIG. 5, a multi-staged compressor system is shown. The multi-stage compressor 76 includes a first compressor 78 and a second compressor 80. First compressor 78 and second compressor 80 are positioned on opposite ends of motor 50, which powers or drives each of compressors 78, 80. Vapor refrigerant is drawn into first compressor 78 through refrigerant line 82. Refrigerant line 82 is supplied by a discharge line 84 of evaporator 38. The vapor refrigerant is compressed by first compressor 78, and discharged into an interstage crossover line 86. Interstage crossover line 86 is connected at an opposite end to a suction line 88 of second compressor 80. The refrigerant is further compressed in second compressor 80 for output in compressor discharge line 90, and supplied to condenser 34, where the compressed vapor refrigerant is condensed into a liquid. In the exemplary embodiment shown in FIG. 5, an optional economizer vessel 92 is inserted into a liquid refrigerant path 94, 96, and the vapor flow line 98 is connected to suction line 88, for providing intermediate pressure refrigerant to second compressor 80, to increase the efficiency of the refrigeration cycle. A source of motor cooling is provided by connecting evaporator 38 to an air gap inside motor 50 inside of hermetic or semi-hermetic compressor 76, through a second refrigerant vapor line 100. Vapor line 100 is in fluid communication with the interior of motor 50, and provides refrigerant at a reduced pressure relative to suction inlet 88 of second compressor 80. In an exemplary embodiment, motor 50 may prevent the cooling vapor to interstage crossover line 86 or a location in fluid communication with interstage crossover line 86, through a vent line 102. The location of the vent line connection determines or establishes the intermediate pressure level in the motor cavity.

In an alternate exemplary embodiment, motor 50 may fit into the cooling vapor back to evaporator 38 through alternate vent line 104, instead of vent line 102. Alternate vent line 104 may be used, for example, in an embodiment where a perfect or nearly perfect seal can be achieved between compressor stages 78, 80 and the motor cavity; in such an embodiment, a minimal loss can correspond with a minimum pressure within the motor cavity, the minimal loss realizable by venting to evaporator 38 through alternate vent line 104. Also, in the case of a single stage compressor 76, motor 50 and the motor cavity may be cooled by a similar method, for example, by venting motor 50 to evaporator 38.

In one exemplary embodiment, liquid refrigerant from condenser 34 may be expanded to vapor to provide motor cooling, as indicated by coolant supply line 106 (FIG. 5), and venting back to an intermediate pressure location, for example, second stage suction inlet 88, first stage discharge or interstage cross-over line 86, or economizer vessel 92.

FIG. 6 illustrates a coolant loop 110, such as for variable speed drive 52 (VSD) (shown in FIGS. 3 and 4) and/or compressor motor 50. Coolant loop 110 provides a refrigerant fluid from condenser 34 via refrigerant line 106 that is regulated by a control device 108, such as a valve of suitable construction, to an opening 112 formed in a motor housing 114. The cooling fluid introduced through opening 112 is transported through grooves 116 formed in a motor housing 114 to cool a motor stator 118. Grooves 116 may be formed along an inside surface of motor housing 114, similar to internal threads of a mechanical fastener. In a further exemplary embodiment grooves 116 may extend substantially sealed within motor housing 114. In a yet further embodiment in which grooves 116 can be fully sealed within motor housing 114, such as by use of a thin, highly thermally conductive sheet of material (not shown) applied along the inside surface of motor housing 114. The sealed grooves 116 can operate as passages formed within motor housing 114. Alternately, water from condenser 34 may be transported through motor housing grooves 116. At an alternate embodiment, stator 118 may be sized to be press-fit into motor housing 114, forming a fluid tight seal between the peripheral surface of stator 118 and grooves 116. Fluid flowing through grooves 116 cools stator 118. After flowing through grooves 116, cooling fluid may then be brought into a heat transfer relationship with heat-generating components 120 located in an enclosure 122, such as variable speed drive components or other components associated with the operation of the vapor compression system to provide cooling for the components. As shown in FIG. 6, grooves 116 can be oriented helically, but may be oriented in different configurations. For example, grooves 116 could similarly be arranged longitudinally in motor housing 114. Alternately, grooves 116 may be molded or cast in motor housing 114 and not require additional tubing 124 positioned in the grooves. One such an exemplary embodiment is shown in FIG. 6A with the tubing oriented in a longitudinal arrangement.

FIG. 6 depicts a portion of a cooling system including a motor 50 (shown in cross-section), control device 108 and condenser 34. Motor 50 has a motor housing 114 that includes a motor cavity 126, a stator 118 and a rotor 128 including a rotor motor shaft 130 that extends through motor housing 114. One or more sets of electromagnetic bearings 132 radially support motor shaft 130 to significantly reduce sliding friction between the shaft and motor housing 114. In an alternate exemplary embodiments, other suitable types of bearings may be used. Thrust bearings to react to axially directed loads are not shown for clarity. At least one compressor impeller 138 is attached to at least one end of motor shaft 130. As further shown in FIG. 6, the fluid travels from condenser 34 through motor housing grooves 116, and then is brought into a heat transfer relationship with the heat-generating components 120. Subsequent to cooling heat-generating components 120, such as those associated with cooling variable speed drive 52 (VSD) (FIG. 4), which are housed within an enclosure 122, the fluid can be returned to motor housing 114 to cool the motor rotor and bearings before returning to a return side of a secondary fluid circuit (not shown in FIG. 6). When the fluid is refrigerant, motor housing 114 may be vented at compressor suction pressure or evaporator pressure. In an alternate embodiment (not shown), heat-generating components 120 may be cooled prior to cooling the motor windings and bearings.

In FIG. 6 (and FIG. 8), the cooling fluid requires a pressure difference in order to be circulated through motor 50. One way to achieve the pressure difference is to provide fluid and expand the fluid using an expansion device, whether fixed or modulating, for example, control device 108 in FIG. 6. If the fluid is provided at a sufficiently high pressure difference through motor 50, for example, between the condenser pressure and compressor suction pressure, a pump (not shown in FIG. 6) should not be required to circulate the fluid through motor 50.

Figure 7A:
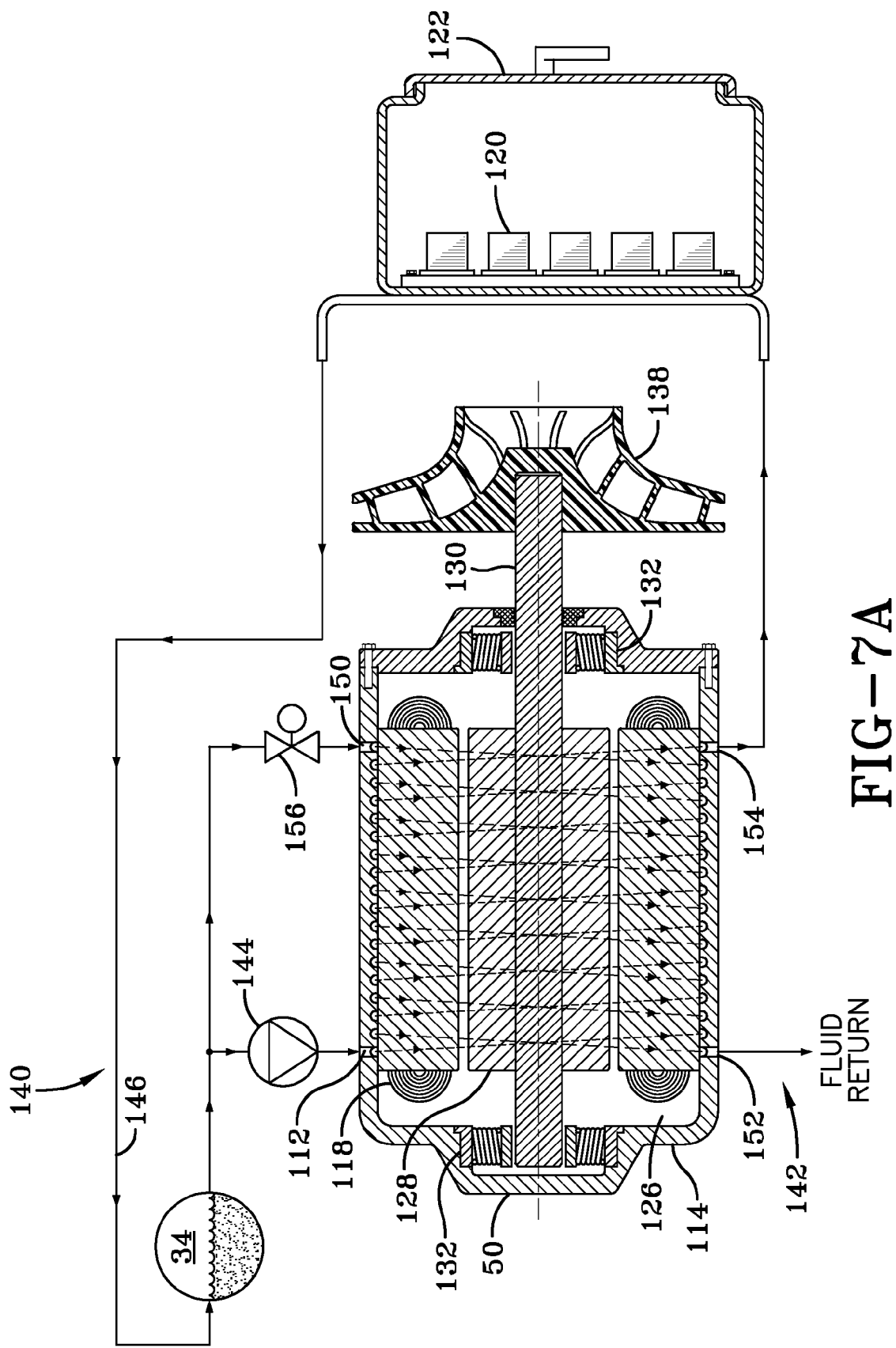
Figure 7B:
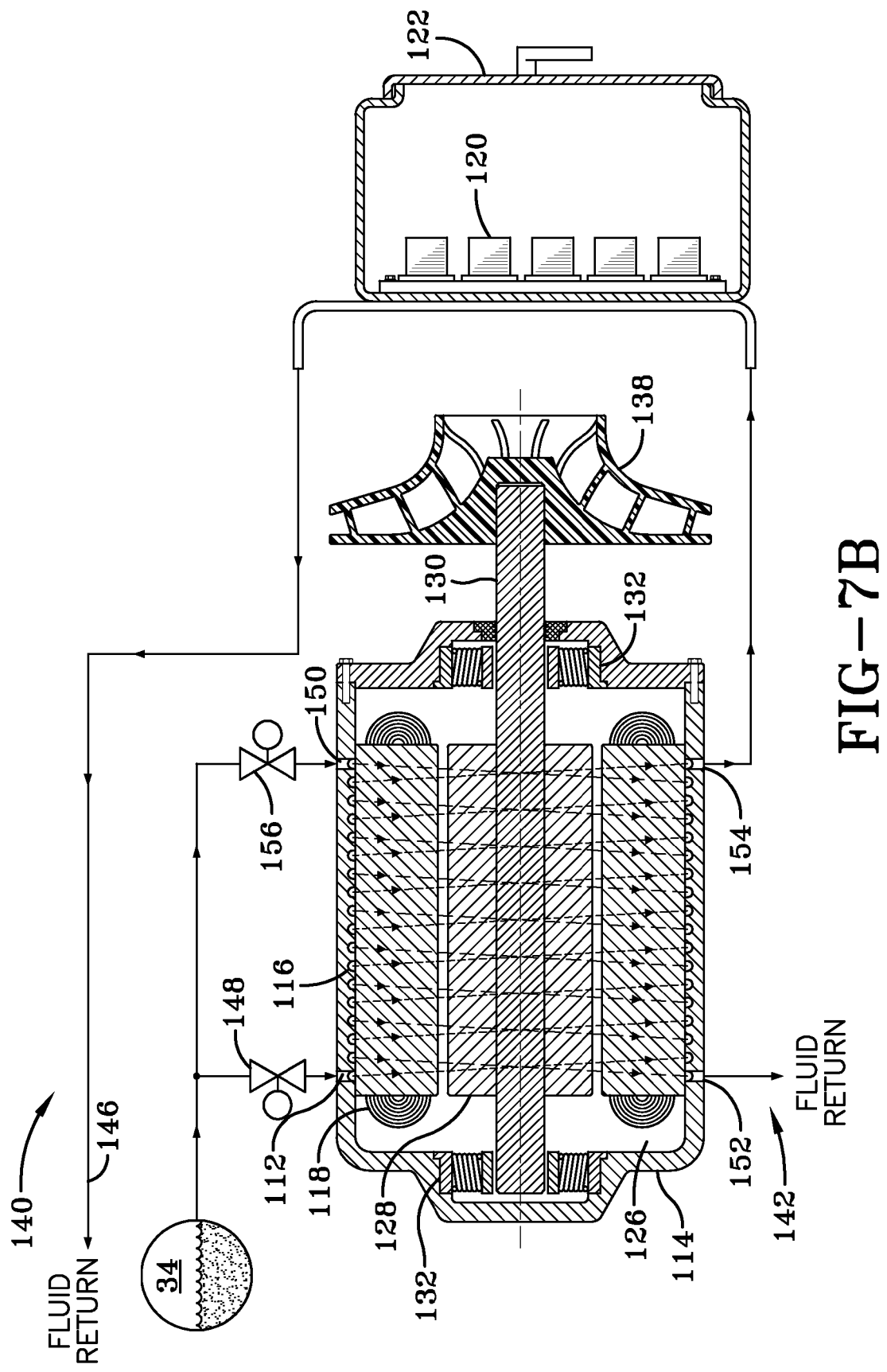

FIGS. 7A and 7B illustrate embodiments similar to FIG. 6, except that two independent refrigerant fluid circuits 140, 142 are provided around motor housing 114 for cooling. Both fluid circuits 140, 142 are fed by liquid refrigerant from condenser 34. In first circuit 140 of FIG. 7A, the two-phase refrigerant discharged from the circuit is returned to condenser 34; therefore, a pump 144 is needed to boost the liquid circulation provided in the circuit. In first circuit 140 of FIG. 7B, the two-phase refrigerant discharged from the circuit may be returned via line 146 to an intercooler 70 (FIG. 4) or an intermediate compressor stage or to an interstage connection (assuming a two-stage compressor 76 (FIG. 5). In such an embodiment, liquid pump 144 is not required to circulate the liquid, and a control valve 148 may be used to provide liquid refrigerant into the circuit through opening 112 of motor housing 114. First circuit 140 of FIGS. 7A and 7B can be adequate for cooling the motor at combinations of low motor speed and power. At higher loads corresponding to a higher motor speed and the power, additional liquid refrigerant may be directed by control valve 156 through an opening 150 of motor housing 114 and into second circuit 142, such as shown in both FIGS. 7A and 7B. In an exemplary embodiment, fluid circuits 140, 142 are independent from each other. The fluid in second circuit 142 exits the motor through an opening 152 of motor housing 114 and can be returned to a low pressure environment, such as evaporator 38 (FIG. 4) or intercooler 70 (FIG. 4) or intermediate compressor stage or to an interstage connection (assuming a two-stage compressor 76 (FIG. 5)).

FIG. 8 illustrates an embodiment for motor cooling similar to FIGS. 7A and 7B, except a fluid circuit 158 introduces fluid from condenser 34 through openings in motor housing 114, such as through openings 152, 154 into motor cavity 126. Condenser fluid then exits motor housing 114, such as openings 112, 150 and is returned to condenser 34 (FIG. 4) or evaporator 38 (FIG. 4). In an alternate embodiment, fluid circuit 158 can also be delivered in heat transfer relationship to a heat-generating components.

Figure 9:
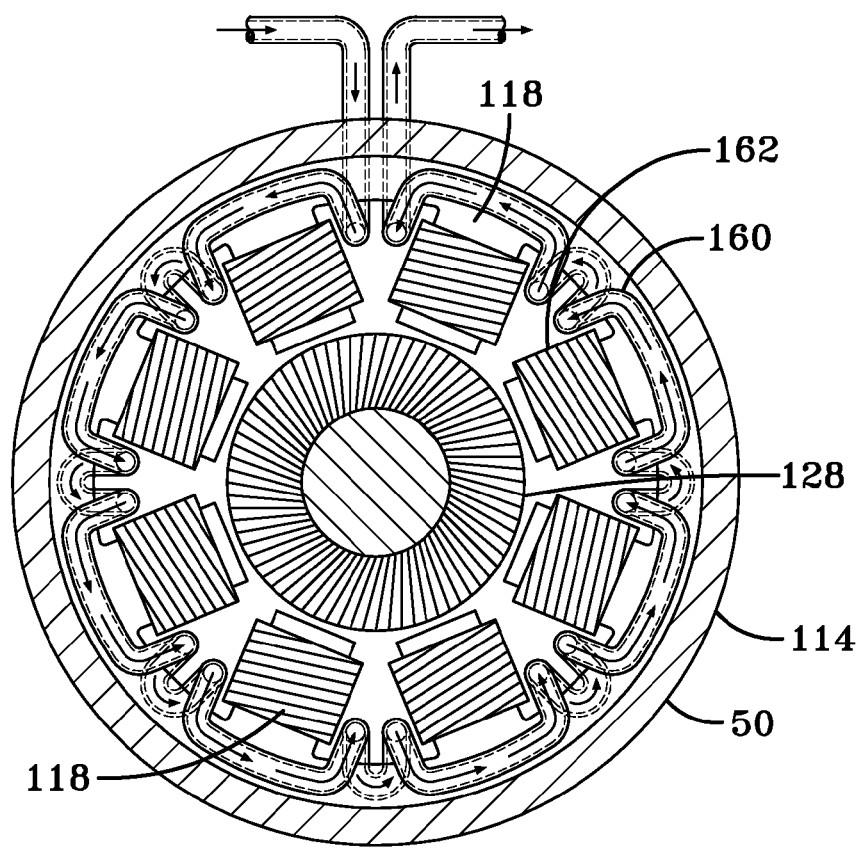
Figure 9A:
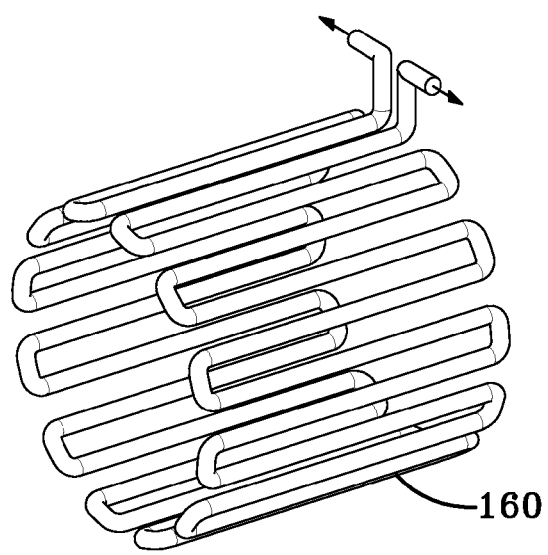

FIGS. 9 and 9A illustrate an embodiment for cooling motor 50 with salient poles 162. A stator 118 is cooled by feeding refrigerant through longitudinally disposed tubing 160 placed in close proximity with salient poles 162 of stator 118, similar to FIG. 6A. Alternately, tubing 160 may be positioned in a parallel arrangement, for example, with the tube bundle of condenser 34 (FIG. 4). In further embodiments, refrigerant at condenser pressure may be pumped by making use of thermosiphon systems. In an alternate embodiment, the fluid circuits can also be delivered in heat transfer relationship to a heat-generating components.

While the exemplary embodiments illustrated in the figures and described are presently preferred, it should be understood that these embodiments are offered by way of example only. Accordingly, the present application is not limited to a particular embodiment, but extends to various modifications. The order or sequence of any processes or method steps may be varied or re-sequenced according to alternative embodiments.

It is important to note that the construction and arrangement of the systems as shown in the various exemplary embodiments is illustrative only. Although only a few embodiments have been described in detail in this disclosure, those skilled in the art who review this disclosure will readily appreciate that many modifications are possible (for example, variations in sizes, dimensions, structures, shapes and proportions of the various elements, values of parameters, mounting arrangements, use of materials, colors, orientations, etc.) without materially departing from the novel teachings and advantages of the subject matter. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments without departing from the scope of the present application.

What is claimed is:
1. A vapor compression cooling system, comprising:
A compressor;
A motor;
A condenser;
An evaporator;
A refrigerant;
A housing;
A cavity within the housing, the motor being within the cavity within the housing
a first fluid circuit connected in fluid communication with the condenser, the housing having a first fluid connection in fluid communication with the cavity to receive refrigerant from the condenser into the cavity, the housing having a second fluid connection in fluid communication with the cavity to deliver refrigerant from the cavity to a heat exchanger for a heat transfer relationship with a heat-generating component, the heat-generating component being positioned heat-generating component being a variable speed drive component, wherein refrigerant in heat transfer relationship with the heat-generating component is returned directly to the condenser.

2. The system of claim 1, wherein the cavity contains electromagnetic bearings to radially support a motor shaft.

3. The system of claim 1, wherein the compressor is a multi-staged compressor.

4. The system of claim 1, comprising a control device in fluid communication between the condenser and the first connection.

5. The system of claim 1, comprising tubing extending longitudinally inside the cavity.

6. The system of claim 5, wherein the tubing is positioned in close proximity with at least one salient pole of a motor stator.

7. The system of claim 1, wherein the housing includes a plurality of grooves formed within the cavity.

8. The system of claim 7, wherein the plurality of grooves are helically arranged.

9. The system of claim 8, comprising tubing positioned in the plurality of grooves.

10. The system of claim 9, comprising a second fluid circuit connected in fluid communication with the condenser, the housing having a third connection in fluid communication with the cavity to deliver a refrigerant from the condenser into the cavity, the housing having a fourth connection in fluid communication with the cavity and in fluid communication with the second circuit.

11. The system of claim 10, wherein the first fluid circuit and the second fluid circuit are independent from each other.

12. The system of claim 10, wherein the first fluid circuit provides liquid refrigerant to the cavity and the second fluid circuit provides vapor refrigerant to the motor.

13. The system of claim 10, wherein the second fluid circuit includes a control device in fluid communication with and positioned between the condenser and a third connection.

14. The system of claim 10, wherein the second fluid circuit includes a pump in fluid communication with and positioned between the condenser and the third connection.

15. The system of claim 10, wherein the second fluid circuit provides liquid refrigerant to the cavity.

16. The system of claim 15, wherein the second fluid circuit provides vapor refrigerant to the cavity.

17. A vapor compression cooling system, comprising:
A compressor;
A motor, powering the compressor;
An expansion valve;
An evaporator;
A housing;
A cavity within the housing, the motor being within the cavity within the housing;
the housing including a plurality of groves formed within the cavity; and
a first fluid circuit is connected in fluid communication with the condenser, the housing having a first connection in fluid communication with the cavity to receive refrigerant from the condenser into the cavity, the housing having a second connection in fluid communication with the cavity to deliver refrigerant from the cavity to a heat exchanger for a heat transfer relationship with a heat-generating component associated with operation of the vapor compression system component the heat-generating component being positioned exterior of the housing, the heat-generating component being a variable speed drive component, wherein refrigerant in heat transfer relationship with the heat-generating component is returned directly to the condenser.

* * * * *

UNITED STATES PATENT AND TRADEMARK OFFICE
CERTIFICATE OF CORRECTION

| | |
|---|---|
| PATENT NO. | : 8,516,850 B2 |
| APPLICATION NO. | : 12/501628 |
| DATED | : August 27, 2013 |
| INVENTOR(S) | : Ivan Jadric et al. |

It is certified that error appears in the above-identified patent and that said Letters Patent is hereby corrected as shown below:

In the Claims

Column 6, line 64, "positioned heat-generating" should read --positioned exterior of the housing, the heat-generating--

Column 8, line 26, "component the" should read --component, the--

Signed and Sealed this
Eleventh Day of March, 2014

Michelle K. Lee
*Deputy Director of the United States Patent and Trademark Office*